US008970344B2

(12) United States Patent
Payson et al.

(10) Patent No.: US 8,970,344 B2
(45) Date of Patent: Mar. 3, 2015

(54) METHOD AND SYSTEM FOR DATA CONTROL IN ELECTRONIC LOCKS

(75) Inventors: John B. Payson, Morris, IL (US); John A. Garlisch, Keeneyville, IL (US); Brock E. Robinson, Crest Hill, IL (US); Kenneth A. Kaczmarz, LaGrange Park, IL (US); Jesse Mavromatis, Palantine, IL (US)

(73) Assignee: CompX International Inc., Greenville, SC (US)

(*) Notice: Subject to any disclaimer, the term of this patent is extended or adjusted under 35 U.S.C. 154(b) by 803 days.

(21) Appl. No.: 12/834,158

(22) Filed: Jul. 12, 2010

(65) Prior Publication Data

US 2011/0012709 A1 Jan. 20, 2011

Related U.S. Application Data

(60) Provisional application No. 61/225,386, filed on Jul. 14, 2009.

(51) Int. Cl.
*G05B 19/00* (2006.01)
*G07C 9/00* (2006.01)

(52) U.S. Cl.
CPC ........ *G07C 9/00103* (2013.01); *G07C 9/00571* (2013.01); *G07C 9/00912* (2013.01)
USPC ............................ 340/5.61; 340/5.2; 340/5.6

(58) Field of Classification Search
USPC .......... 340/1.1, 5.1–5.2, 5.6–5.61, 5.64–5.65, 340/5.7–5.92
See application file for complete search history.

(56) References Cited

U.S. PATENT DOCUMENTS

| | | | |
|---|---|---|---|
| 3,504,511 | A | 4/1970 | Allen |
| 3,666,342 | A | 5/1972 | Biesecker |
| 3,792,391 | A | 2/1974 | Ewing |
| 3,804,441 | A | 4/1974 | Kobayashi et al. |
| 3,917,330 | A | 11/1975 | Quantz |
| 4,017,107 | A | 4/1977 | Hanchett |
| 4,026,589 | A | 5/1977 | Hanchett, Jr. |
| 4,262,830 | A | 4/1981 | Haves |
| 4,268,076 | A | 5/1981 | Itoi |
| 4,390,197 | A | 6/1983 | Butts |
| 4,595,220 | A | 6/1986 | Hanchett, Jr. et al. |
| 4,623,178 | A | 11/1986 | Geringer et al. |
| 4,626,010 | A | 12/1986 | Hanchett, Jr. et al. |

(Continued)

OTHER PUBLICATIONS

Sep. 18, 2013 Office Action issued in U.S. Appl. No. 12/888,510.

*Primary Examiner* — James Yang
(74) *Attorney, Agent, or Firm* — Dority & Manning, P.A.

(57) ABSTRACT

Disclosed are apparatus and corresponding methodologies for data control in an electronic access control system. A plurality of electronic locks are connected to a central server over a network such as an 802.11 WiFi wireless network that may be used to provide data updates and management for the individual electronic locks. To address power management problems associated with electronic locks having the capability to communicate over an 802.11 WiFi network, the present disclosure provides method and apparatus for selectively powering on and off an 802.11 WiFi communications module integrated into the electronic lock to conserve power resources. An electronic access control system is disclosed which allows efficient data exchange between a central server and a plurality of electronic locks using a database structure, and which allows for multiple simultaneous database manipulations in a cost effective manner.

12 Claims, 8 Drawing Sheets

(56) References Cited

U.S. PATENT DOCUMENTS

| | | | | |
|---|---|---|---|---|
| 4,648,036 | A * | 3/1987 | Gallant | 1/1 |
| 4,667,990 | A | 5/1987 | Quantz | |
| 4,667,991 | A | 5/1987 | Pèbre | |
| 4,748,833 | A | 6/1988 | Nagasawa | |
| 4,901,545 | A | 2/1990 | Bacon et al. | |
| 4,956,984 | A | 9/1990 | Chi-Cheng | |
| 4,967,577 | A | 11/1990 | Gartner et al. | |
| 5,007,261 | A | 4/1991 | Quantz | |
| 5,020,345 | A | 6/1991 | Gartner et al. | |
| 5,033,282 | A | 7/1991 | Gartner et al. | |
| 5,134,870 | A | 8/1992 | Uyeda et al. | |
| 5,142,890 | A | 9/1992 | Uyeda et al. | |
| 5,307,656 | A | 5/1994 | Gartner et al. | |
| 5,474,348 | A | 12/1995 | Palmer et al. | |
| 5,484,180 | A | 1/1996 | Helmar | |
| 5,520,450 | A | 5/1996 | Colson, Jr. et al. | |
| 5,540,068 | A | 7/1996 | Gartner et al. | |
| 5,617,082 | A | 4/1997 | Denison et al. | |
| 5,690,373 | A | 11/1997 | Luker | |
| 5,769,011 | A | 6/1998 | Daniel | |
| 5,806,355 | A | 9/1998 | Lanigan et al. | |
| 5,876,073 | A | 3/1999 | Geringer et al. | |
| 5,927,772 | A | 7/1999 | Antonucci et al. | |
| 5,934,720 | A | 8/1999 | Karalius | |
| 6,021,038 | A | 2/2000 | Hanchett, Jr. | |
| 6,089,058 | A | 7/2000 | Elpern et al. | |
| 6,089,626 | A | 7/2000 | Shoemaker | |
| 6,092,846 | A | 7/2000 | Fuss et al. | |
| 6,108,188 | A | 8/2000 | Denison et al. | |
| 6,112,502 | A | 9/2000 | Frederick et al. | |
| 6,125,670 | A | 10/2000 | Fuss et al. | |
| 6,133,842 | A | 10/2000 | Gariepy | |
| 6,209,367 | B1 | 4/2001 | Hyatt et al. | |
| 6,359,547 | B1 | 3/2002 | Denison et al. | |
| 6,384,711 | B1 | 5/2002 | Cregger et al. | |
| 6,390,520 | B1 | 5/2002 | Holzer | |
| 6,655,180 | B2 | 12/2003 | Gokcebay et al. | |
| 6,708,538 | B1 | 3/2004 | Walby | |
| 6,730,867 | B2 | 5/2004 | Hyp | |
| 6,741,160 | B1 | 5/2004 | Dawson et al. | |
| 6,791,450 | B2 | 9/2004 | Gokcebay et al. | |
| 6,816,075 | B2 | 11/2004 | Grunes et al. | |
| 6,879,243 | B1 | 4/2005 | Booth et al. | |
| 6,886,869 | B2 | 5/2005 | Martinez et al. | |
| 6,950,944 | B2 | 9/2005 | Yager et al. | |
| 6,983,884 | B2 | 1/2006 | Auchinleck | |
| 7,004,517 | B2 | 2/2006 | Vitry et al. | |
| 7,021,684 | B2 | 4/2006 | Orbeta et al. | |
| D520,340 | S | 5/2006 | Freck | |
| 7,131,673 | B2 | 11/2006 | Cherry et al. | |
| 7,239,963 | B2 * | 7/2007 | Suzuki | 701/438 |
| 7,296,830 | B2 | 11/2007 | Koveal et al. | |
| 7,336,150 | B2 | 2/2008 | Gokcebay et al. | |
| 7,455,335 | B2 | 11/2008 | Garneau et al. | |
| 7,456,725 | B2 | 11/2008 | Denison et al. | |
| 7,469,564 | B1 | 12/2008 | Shaw | |
| 7,472,934 | B2 | 1/2009 | Burke et al. | |
| 7,482,907 | B2 | 1/2009 | Denison et al. | |
| 7,516,632 | B2 | 4/2009 | Poppell | |
| 7,516,633 | B1 | 4/2009 | Chang | |
| 7,603,882 | B2 | 10/2009 | Carbajal et al. | |
| 7,683,758 | B2 | 3/2010 | Denison et al. | |
| 7,728,711 | B2 | 6/2010 | Shoenfeld | |
| 7,741,952 | B2 | 6/2010 | Denison et al. | |
| 7,768,378 | B2 | 8/2010 | Hill et al. | |
| 8,047,582 | B1 | 11/2011 | Rodgers et al. | |
| 8,104,803 | B2 | 1/2012 | Horton et al. | |
| 8,207,858 | B2 | 6/2012 | Knopf et al. | |
| 8,490,443 | B2 | 7/2013 | Gokcebay | |
| 8,495,898 | B2 | 7/2013 | Gokcebay | |
| 2002/0014950 | A1 | 2/2002 | Ayala et al. | |
| 2002/0112174 | A1 * | 8/2002 | Yager et al. | 713/200 |
| 2003/0024288 | A1 | 2/2003 | Gokcebay et al. | |
| 2004/0032131 | A1 | 2/2004 | Cherry | |
| 2004/0084526 | A1 | 5/2004 | Knowles et al. | |
| 2005/0146419 | A1 | 7/2005 | Porter | |
| 2005/0179517 | A1 | 8/2005 | Harms et al. | |
| 2005/0199026 | A1 | 9/2005 | Geringer et al. | |
| 2005/0225097 | A1 | 10/2005 | Geringer et al. | |
| 2006/0097522 | A1 | 5/2006 | Denison et al. | |
| 2006/0097525 | A1 | 5/2006 | Toma et al. | |
| 2006/0139148 | A1 | 6/2006 | Faro et al. | |
| 2006/0139149 | A1 | 6/2006 | Faro et al. | |
| 2006/0150694 | A1 | 7/2006 | Frolov et al. | |
| 2006/0186678 | A1 | 8/2006 | Myers et al. | |
| 2007/0018791 | A1 * | 1/2007 | Johnson et al. | 340/5.73 |
| 2007/0046040 | A1 | 3/2007 | Chang | |
| 2007/0125100 | A1 * | 6/2007 | Shoenfeld | 62/125 |
| 2007/0169525 | A1 | 7/2007 | Chang | |
| 2007/0188303 | A1 | 8/2007 | Faro et al. | |
| 2007/0245784 | A1 | 10/2007 | Geringer et al. | |
| 2007/0257773 | A1 | 11/2007 | Hill et al. | |
| 2007/0277571 | A1 | 12/2007 | Gokcebay | |
| 2008/0084836 | A1 | 4/2008 | Baird et al. | |
| 2008/0169657 | A1 | 7/2008 | Horton et al. | |
| 2008/0224481 | A1 | 9/2008 | Geringer et al. | |
| 2008/0246286 | A1 | 10/2008 | Ostrowski | |
| 2008/0252083 | A1 | 10/2008 | Carabalona | |
| 2008/0293019 | A1 | 11/2008 | Dooley et al. | |
| 2009/0102415 | A1 | 4/2009 | Muchow et al. | |
| 2009/0132090 | A1 | 5/2009 | Kaczmarz et al. | |
| 2009/0282879 | A1 | 11/2009 | Marcelle et al. | |
| 2010/0033329 | A1 | 2/2010 | Davis et al. | |
| 2010/0141381 | A1 * | 6/2010 | Bliding et al. | 340/5.61 |

* cited by examiner

METHOD AND SYSTEM FOR DATA CONTROL IN ELECTRONIC LOCKS

PRIORITY CLAIM

This application claims the benefit of previously filed U.S. Provisional Patent Application entitled "METHOD AND SYSTEM FOR DATA CONTROL IN ELECTRONIC LOCKS," assigned U.S. Ser. No. 61/225,386, filed Jul. 14, 2009, and which is incorporated herein by reference for all purposes.

FIELD OF THE INVENTION

The present subject matter generally relates to lock or access control systems, and more particularly to data control for electronically controlled lock systems such as may be applied to various storage enclosures or cabinets to provide secure storage of various items, equipment, materials, and/or information within the enclosures or cabinets. More specifically, certain present aspects may relate to connection of a plurality of electronic locks to a central server over a network such as an 802.11 WiFi wireless network, which in turn may be used to provide data updates and management for the individual electronic locks.

BACKGROUND OF THE INVENTION

Many occasions arise that require or make desirable access control of different cabinets, entryway doors, carts, tool boxes, and/or other types of boxes, hereafter (regardless generally of their compositions, materials, or configurations) collectively referred to as an enclosure or cabinet. Such enclosures or cabinets may be provided with doors and/or may also include drawers.

The need and/or desire for access control usually arises from the lack of security often provided by typical lock and key mechanisms. For example, a mechanical key may be lost or stolen. Once such a lost or stolen key has been surreptitiously obtained by an unauthorized individual, such individual in possession of such key may easily access the secured enclosure to either steal its contents or, as in the case of secured medical records or other confidential documents, view its contents. Further, when such enclosures or cabinets are accessed, there is typically no record that it has been accessed, let alone who accessed it or when such access took place.

Such shortcomings of keyed mechanical locks have contributed to the creation of the specialized field of electronic access control.

Typically, electronic access control may correspond to a three part system, including, for example: (1) a credential reader, (2) a microprocessor based control circuit, and (3) an electronic lock to open or unlock the enclosure being secured by the access control system.

Credential readers may include, but are not limited to: keypads, magnetic stripe card readers, proximity card readers, "ibuttons," smart card readers, and/or bar code card readers. In the recent past, there has been significant progress in the field of biometrics that includes, but is not limited to, the ability to reliably read and discern an individual's fingerprints, handprints, and retina and/or facial features.

Generally speaking, credential and/or biometric readers typically convert their applicable credential or biometric features, respectively, into a binary number. A microprocessor based system then reads and analyzes such binary number. Such systems are typically either standalone (attached to the reader) or networked (attached to many readers). Typically, they may read the binary number that corresponds to the potential entrant's credential or biometric features and compare it to a list of approved binary numbers. In such fashion, the microprocessor based system determines if the potential entrant has the right to access the enclosure or cabinet being secured by the access control system.

If the microprocessor based system determines that the subject credential or biometric feature under consideration is valid, access is granted to the enclosure. Typically, such is accomplished by the microprocessor turning on an electronic control circuit corresponding to solid state devices or relays which in turn provide a useable electrical voltage to open an electronic lock mechanism.

The electronic access control system may be networked to control multiple electronic locks for providing secure storage for many cabinets or enclosures, or individual doors and drawers in such cabinets or enclosures. Such electronic access control systems often require the management and control of various types of data associated with the electronic access system and/or a particular electronic lock, enclosure, or cabinet. Such is particularly true for electronic access control systems that include multiple electronic locks configured to control access to multiple different enclosures or cabinets. For example, such electronic access control systems may include a significant amount of stored data regarding both users of the electronic access system and the electronic locks themselves. Typical user data may include: user name, credential type and ID, supervisor level, and valid access times. Typical lock data may include: lock name, access hardware (e.g. keypad or hardware), and open time. Electronic access control systems also typically include a database of relational data detailing which users can access or open which electronic locks.

Other types of data or information used in electronic control systems may include inventory data and/or audit trail data. Many occasions arise where there is an identified need to store and track individual items or particular types of items stored in a cabinet or enclosure. One such circumstance relates to the field of controlled medications (i.e. medicinal products) and, in particular, narcotics as may be administered to patients in a medical facility. Another application may be in the storage of tools or other parts in cabinets or enclosures. In such occasions, it may be desirable to maintain inventory data at the electronic lock as to the status of individual items or particular types of items stored in a cabinet or enclosure.

It may also be desirable to store and track which users gained access to which cabinets or enclosures, as well as the time of such access by the user. Such information or data may be tracked and stored as audit trail data and conveyed in an audit trail report to a supervisor or other individual.

Certain access control systems also incorporate environmental monitoring systems that can record environmental data, such as temperature. For example, as is known in the medical profession, certain medications may be temperature sensitive and rendered unfit for use if not maintained within a given temperature range. Under such conditions, therefore, a need exists not only to secure such medications but to also continuously monitor the temperature at which they are stored. Such data may also be conveyed in an audit trail format to a supervisor or other individual.

The various data used or created by the access control system may need to be modified or updated, often on a regular basis, due to the continuously changing circumstances of the environment in which the access control system is used. For example, updates may need to be made as to which users can access which cabinets or enclosures. In the storage of medical products, updates may be desired which may include: settings of respective high and low temperature limits for the storage of the medical products, settings of the permitted time period outside such desired limits, settings of various alarms, and the setting of restricted access if certain limits are reached.

Access control systems may allow manipulation and control of the access control data at the actual electronic lock itself. In such circumstances, the updating and modification of access control data for each of the individual electronic locks may require a supervisor, serviceman, or someone of higher position than a "normal" user to go to the lock with a computer such as a laptop computer to perform the data updating and manipulation. Once such person is at the electronic lock, the person can connect to the electronic lock with the computer and update the lock's memory with current settings as well as download audit trails, environment data, or other information. Such method though requires someone to visit each electronic lock that needs to be updated. If there are hundreds of locks that need to be maintained, such process can be quite time consuming and expensive.

In other systems, access control data may be updated on a central computer. Currently there are systems that will allow remote database manipulation and audit trail or other information downloads. Such systems, however, typically require (1) a wired network such as, for example, an Ethernet network; (2) proprietary access control protocols, which require individual wiring to each lock; or (3) low power RF systems, which require access points to transfer information onto a computer network. Each of such options is expensive and does not lend itself well to an electronic lock being operatively associated with a portable device, such as a medical cart or a tool box.

Therefore, currently there is a need for a system that will allow remote control and manipulation of access control system data through a wireless system such as an existing 802.11 wireless network (also referred to herein as a "WiFi" wireless network).

Current WiFi wireless network technology does not lend itself to long term battery operation. Most WiFi wireless network technology is designed for use in laptop computers and cellular telephones. Users of such types of devices are accustomed to charging their devices periodically, such as about every other day or the like. Recharging electronic lock batteries on such a schedule is commercially unacceptable. Therefore, there is a need to implement control and manipulation of access control data over a WiFi wireless network in a fashion that will not require constant battery drain and recharging.

In addition, an access control system capable of updating multiple electronic locks simultaneously, such as over a WiFi network or other network, may generate database control problems. Low end database control systems utilizing, for example, Microsoft Access, lose significant reliability if multiple database manipulations occur simultaneously. In order to accomplish multiple reliable database manipulations simultaneously, a more sophisticated database management system may be required. However, using such a sophisticated database management system creates difficulties in implementation, as microprocessors in electronic locks that can communicate with such databases are relatively more expensive. Moreover, such microprocessors do not lend themselves to low energy consumption. Thus, a need exists for an access control system that can process multiple simultaneous database manipulations in a cost effective manner.

U.S. Patent Application Publication No. 2002/0014950 describes a method for programming a key for selectively allowing access to at least one enclosure having a lock controlled by a lock controller.

U.S. Patent Application Publication No. 2007/0188303 describes a system, method, and apparatus for controlling access to a storage unit having one or more lockable compartments, at least one locking/unlocking apparatus for the one or more lockable compartments, a unit controller and a power supply electrically connected to the at least one locking/unlocking apparatus and the unit controller. The unit controller is communicably coupled to the locking/unlocking apparatus and receives a message from a remote controller and controls the locking/unlocking apparatus based on the message.

U.S. Patent Application Publication No. 2007/0257773 describes apparatus and methodology for providing a retrofittable lock assembly for an enclosure. A manually or electronically accessible lock may be attached to an enclosure to store access to items stored in the enclosure. The retrofittable lock contains electronic circuitry that maintains a record of user identification, date, and time of access of users seeking access to items stored in the database.

U.S. Patent Application Publication No. 2008/0084836 describes a low power wireless communication method that has a remote device with a simple receiver that listens for a wake-up signal.

While various implementations of data control for access control systems have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, improved apparatus and methodology are presently disclosed for data control in electronic lock based access control systems. It is to be understood that the present subject matter equally encompasses both apparatus and methodology.

In one exemplary configuration, an electronic access system may include a plurality of electronic locks connected over a network to a central server. Data can be exchanged between the plurality of electronic locks and the central server over the network.

In accordance with certain aspects of certain embodiments of the present subject matter, the plurality of electronic locks may be connected over an 802.11 WiFi wireless network.

In accordance with yet additional aspects of certain embodiments of the present subject matter, the electronic access system may be configured to effectively manage power supply resources of electronic locks so that the electronic locks can communicate over the network.

In accordance with yet further aspects of certain embodiments of the present subject matter, the electronic access system may relatively more efficiently exchange information between the central server and the plurality of electronic locks over the network, and process multiple simultaneous database manipulations in a cost effective manner.

Generally speaking, one advantage offered by the present subject matter is for network communications to be initiated at the lock end, which in many cases will ease network router configuration.

In addition to the foregoing, one present exemplary embodiment relates to an electronic access control system for data control for electronically controlled lock systems, comprising a communications network; a plurality of electronic locks, and a central server. Preferably, such plurality of electronic locks are respectively associated with a plurality of securable enclosures, with each of such locks having respective network communications devices for respectively connecting such each electronic lock with such communications network, while such central server is connected with such plurality of electronic locks over such network, and selectively provides at least one of data updates and management for each of such electronic locks.

In certain alternatives of the foregoing exemplary present electronic access control system, such network communications devices may comprise 802.11 WiFi wireless communications modules; and such communications network may be capable of communicating with 802.11 WiFi wireless communications modules.

In other present alternatives, communications between such network and such respective network communications devices include one of hardwired and wireless communications links, or both.

For other present exemplary alternative electronic access control systems, each of such electronic locks may include a power source and a controller for powering on an associated 802.11 WiFi communications module with such power source at predetermined time intervals to enable communication over such network, and for powering off such associated module at one of either of a predetermined time interval after such associated communications module has been powered on, or once updates have been downloaded from such central server and once all lock data have been uploaded to such central server. In some such alternative embodiments, such controller may include a microprocessor, main memory, random access memory, and input/output features. In further particular alternatives of the foregoing, such controller input/output features may include a control panel having navigation keys for programming selected operational characteristics of an associated electronic lock.

In various present alternative embodiments, a exemplary power source may comprise a battery, while such electronic locks may each respectively further include data memory to record associated electronic lock activities and data, an electronic latch, a visual display, and a user interface. In various such alternative electronic access control systems, such associated electronic lock activities and data recorded in such data memory may include at least one of user name, credential type and ID, supervisor level, valid access times, lock name, access hardware type, open time, authorized user lists, inventory data, audit trail data, and environmental tracking data. In other present alternatives, a controller of an associated electronic lock may be operative to provide access to an associated enclosure through actuation of an associated latch upon presentation of a valid access credential by a user via input/output features of such controller.

For other present alternative embodiments, such electronic latch may comprise a motorized latch; and selected of such securable enclosures may comprise a temperature controlled cabinet with an associated temperature transducer therein for providing environmental tracking data. Further, selected of such electronic locks may include adjustable settings, including at least one of alarm settings and temperature limit settings, and records data for alarm status and events, and supervisor status required after alarm events.

In various present alternative embodiments of an electronic access control system, the central server and each of such plurality of electronic locks may each include a database structure, to facilitate efficient data exchange between such central server and such plurality of electronic locks by allowing multiple simultaneous database manipulations via such communications network. In others, a PC may be provided in communication with one of such central server and such network, and operable with a database structure for data exchange with such plurality of electronic locks. In certain present alternatives, such database structure may include databases LOCKIS, LOCKWAS, PCIS, and PCWAS. In some present alternatives, such a PC may be operable for allowing a supervisor level user to selectively update such plurality of electronic locks and to selectively track lock data from such plurality of electronic locks.

For other present alternative exemplary embodiments, selected enclosures may include a plurality of separate compartments; and selected of such plurality of electronic locks may be respectively associated with respective separate compartments of a given enclosure. Further, such selected enclosures may comprise cabinets and such plurality of separate compartments may respectively comprise one of individual doors and drawers.

Per yet further alternatives, selected of the plurality of electronic locks may each respectively have associated housings for retrofit to selected of such plurality of securable enclosures. Additionally, for some embodiments, the plurality of electronic locks may each comprise a main housing associated with an enclosure, an electronic assembly, a battery pack, a communications port, a programming keypad, a display, and a strike assembly and associated latch bolt.

Per other present alternative embodiments of an electronic access control system, at least one additional server may be provided interoperative with the central server for implementation of server processes.

In accordance with another alternative exemplary embodiment of the present subject matter, an electronic network system is provided for electronically controlled locks, comprising a communications network, a plurality of electronic locks, and a central server. Preferably in such embodiment, such communications network is capable of communicating with 802.11 WiFi wireless communications modules; such plurality of electronic locks, respectively associated with a plurality of securable enclosures, each have respective 802.11 WiFi wireless communications modules for respectively connecting such each electronic lock with such communications network, a battery, a microprocessor-based controller for selectively powering on and off such module with such battery, a main housing associated with an enclosure, data memory to record associated electronic lock activities and data, an electronic latch, a visual display, and a user interface. Further preferably, such central server is connected with such plurality of electronic locks over such network, and selectively provides data updates and data management for each of such electronic locks. Still further preferably, each of such electronic locks is operative to provide access to an associated enclosure through actuation of an associated electronic latch upon presentation of a valid access credential to such user interface thereof.

In variations of such electronic network system, each of such controllers for such plurality of electronic locks may be further operative for powering on an associated 802.11 WiFi communications module with such battery at predetermined time intervals to enable communication over such network, and for powering off such associated module at one of either of a predetermined time interval after such associated communications module has been powered on, or once updates have been downloaded from such central server and once all data from such data memory have been uploaded to such central server.

In other present variations, each of such controllers may further include a control panel having navigation keys for programming selected operational characteristics of an associated electronic lock. Further alternatively, each of such data memories may include recorded therein for an associated electronic lock at least one of user name, credential type and ID, supervisor level, valid access times, lock name, access hardware type, open time, authorized user lists, inventory data, audit trail data, and environmental tracking data.

For other present exemplary variations of the foregoing electronic network system, at least one of such securable enclosures may comprise a temperature controlled cabinet with an associated temperature transducer therein for providing environmental tracking data; and selected of such electronic locks may include adjustable settings, including at least one of alarm settings and temperature limit settings, and records data for alarm status and events, and supervisor status required after alarm events.

In other present alternatives, such central server and each of such plurality of electronic locks each may include a database structure which includes databases LOCKIS, LOCKWAS, PCIS, and PCWAS; and such system may further include a PC in communication with one of such central server and such network, and operable with such database structure, for data exchange with such plurality of electronic locks, to facilitate efficient data exchange between such central server and such plurality of electronic locks by allowing multiple simultaneous database manipulations via such communications network.

Per other present alternative electronic network systems, a PC may be provided in communication with one of such central server and such network, and operable for allowing a supervisor level user to selectively update such plurality of electronic locks and to selectively track lock data from such plurality of electronic locks.

In other present alternative electronic network systems, selected of such plurality of electronic locks may each respectively have associated housings for retrofit to such plurality of securable enclosures; selected of such enclosures may include a plurality of separate compartments; and selected of such plurality of electronic locks may be respectively associated with respective separate compartments of a given enclosure.

As otherwise referenced herein, it is to be understood that the present subject matter equally relates to corresponding and associated methodology. One present exemplary embodiment of the present subject matter relates to methodology for an electronic access control system for data control for electronically controlled lock systems. Such an exemplary present method preferably comprises providing a communications network; providing a plurality of electronic locks, each of such locks having respective network communications devices for respectively connecting such each electronic lock with such communications network; respectively associating such plurality of locks with a plurality of securable enclosures; providing a central server connected with such plurality of electronic locks over such network; and selectively providing at least one of data updates and data management for each of such electronic locks, conducted by such central server over such network.

Another present exemplary method relates to methodology for extending battery life for electronically controlled locks operative in an electronic network system, such exemplary method comprising the steps of providing a communications network capable of wireless communications; providing a plurality of electronic locks, respectively associated with a plurality of securable enclosures, each of such locks having respective wireless communications modules, a battery, and data memory to record associated electronic lock activities and data; providing a central server, connected with such plurality of electronic locks over such network; selectively providing data updates and data management for each of such electronic locks; selectively providing access to an associated enclosure through actuation of an associated electronic lock upon presentation of a valid access credential to such lock; and providing respective controllers for each of such plurality of electronic locks, operative for powering on an associated communications module with such battery at predetermined time intervals to enable communication over such network, and for powering off such associated module at one of either of a predetermined time interval after such associated communications module has been powered on, or once updates have been downloaded from such central server and once all data from such data memory have been uploaded to such central server.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures).

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
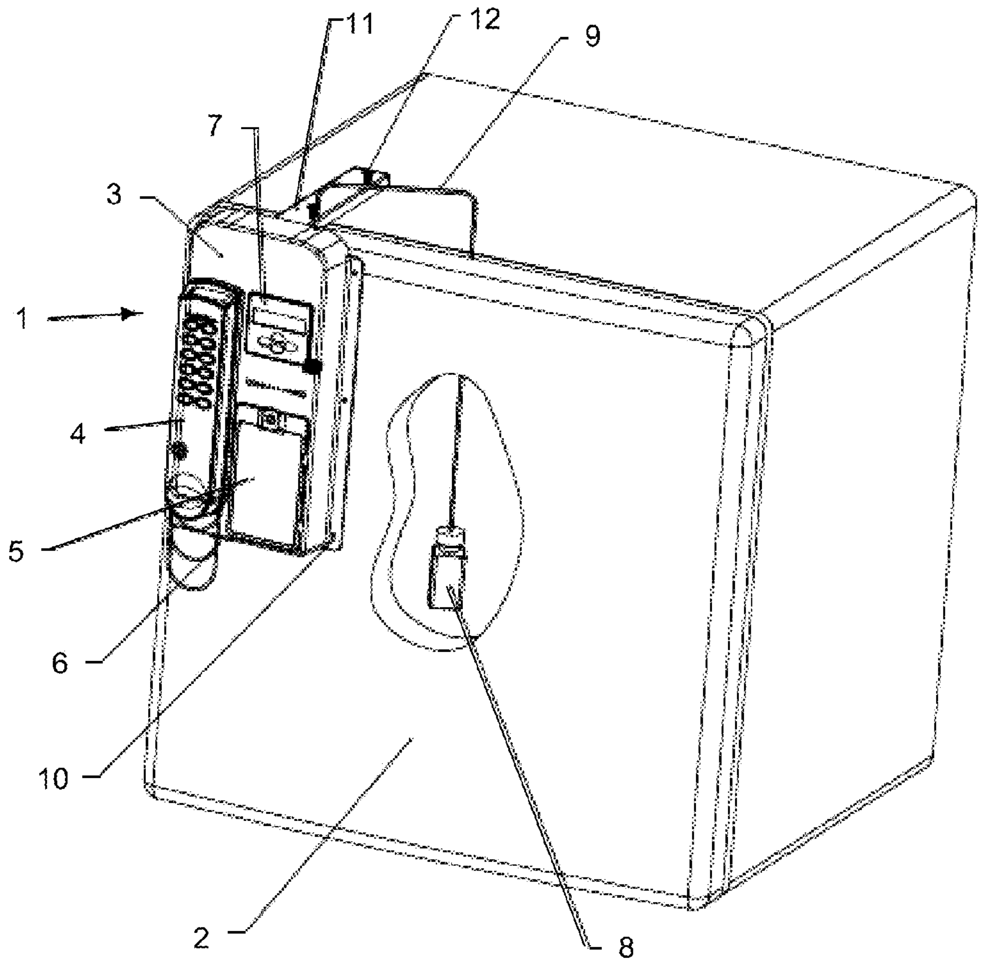
FIG. 1 depicts an upper right isometric view of an exemplary representative enclosure with a representative door thereof in a closed and locked position, further illustrated with an exemplary lock provided in accordance with one embodiment of the present technology installed thereon, and illustrating the door thereof in partial cutaway for illustration of various present features internal to such enclosure.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is concerned with data control for electronically controlled lock systems.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

It should be specifically noted that while the present disclosure generally describes the lock disclosed herein as a retrofittable lock, such terminology should not be taken as a limitation of the present subject matter in any way as the presently disclosed lock may, indeed, be provided as original equipment.

The present subject matter relates to data control for electronically controlled lock systems. Such electronically controlled lock systems include one or more electronic locks used to provide secure storage of various items within a cabinet or drawer. An exemplary electronic lock may include a motorized latch and an electronic access control circuit mounted within a plastic housing and provided in the illustrated embodiment as a retrofittable lock for the cabinet or enclosure. The present subject matter equally encompasses original equipment installations of the present subject matter. A user interface may be provided through an LCD display and control panel mounted on the face of the housing.

Additionally, an optional temperature transducer (which is continuously monitored by the electronic access control circuit) may be provided for installation within a temperature controlled cabinet or enclosure. The housing may be easily mounted to most cabinets or enclosures in minimal time, with minimal tools, and without disassembly of the cabinet or enclosure. The optional temperature transducer and its associated wiring to the control circuit are also easily installed within the cabinet with minimal interference with the door seal. The main assembly readily mounts to the cabinet door or drawer such as with tamper resistant sheet metal screws, double sided tape, or by other appropriate securing means including, for example, pop-rivets. The motorized latch in the main assembly may engage a rectangular hole in the strike, preventing the cabinet door from being opened.

It is to be understood by those of ordinary skill in the art that the present subject matter equally encompasses other optional features, different than just an optional temperature transducer. For example, one or more optional devices may be utilized with the present subject matter to detect a variety of environmental conditions, or other conditions. For example, either or both of temperature and humidity may be detected relative to a room or a piece of equipment, of vibrations levels or other characteristics of such room/equipment may be monitored.

In certain present embodiments, the LCD display of the electronic lock may continuously display temperature within the controlled enclosure, and, in conjunction with the control panel, may allow changes to be entered to, for example, the temperature based programmable settings. Additionally, the unit may function to provide access control to the enclosure. The unit relatively quickly unlatches upon presentation of a valid access credential by the user: typically a key pad entered PIN or electronic card. The control circuitry allows for a large number of different valid credentials to be used for access and has the ability to record each entry creating an "audit trail". The "audit trail" may, for example, consist of the card or PIN number that gained access as well as the date and/or time of access.

The access control system also may provide a data-logging feature. That is, users will have the ability to view and download various data associated with the electronic lock, including "audit trail" data and temperature data. Such history can be viewed by pressing a designated button, such as an "up" button, on the keypad, which will display the maximum observed temperature; or by pressing a "down" button on the keypad, which will display the minimum observed temperature. The data can be logged in predetermined increments with the size of the increment being set by the system administrator. In addition to viewing the max/min observed temperatures, the system is provided with the ability to connect a personal computer (PC) and download the data containing the historical temperature record of the enclosure.

Additionally, the system is provided with the ability to connect individual electronic locks over a network to a central server. The network connections may be either hardwired or wireless, such as through an RF interface or through an 802.11 WiFi wireless network. Data and programming associated with individual locks and the access control system may be remotely downloaded/uploaded from or to the central server through the network. As used herein, a network may include a dial-in network, a local area network (LAN), wide area network (WAN), public switched telephone network (PSTN), the Internet, intranet or other type(s) of networks, now or later existing, including hybrid and/or meshed networks. A network may include any number and/or combination of hard-wired, wireless, or other communication links.

An individual attempting access to the cabinet or enclosure will present their access control credential (PIN, magnetic stripe card, proximity card, biometric, etc.) to the access control circuitry through a relevant reader. The access control circuitry compares the credential to a known list of valid credentials and determines validity. If the credential is valid, access will be granted.

According to an exemplary embodiment of the present technology, a motor/gear train assembly may be used to retract a slam latch bolt. A gear motor housing is attached to the inside of the main lock housing, which is attached to the front of the cabinet or enclosure. In the normal or locked state, a latching bolt protrudes from the top of the lock assembly engaging a strike plate mounted on top of the cabinet or enclosure. The interaction of the latching bolt and the strike plate prevents someone from surreptitiously gaining access to the cabinet or enclosure. When the slam latch bolt is drawn in, it is pulled out of the strike, which is attached to the top of the cabinet or enclosure, allowing the cabinet door to be opened.

Representative operation of the lock may proceed as follows. For purposes of this representative description, the starting point will be with the cabinet locked and a user attempting to enter the cabinet to acquire various items stored within the cabinet. To begin the open cycle, the user enters a credential or presents a biometric to the electronic lock. The access control circuitry compares the credential (or biometric) to a known list of valid credentials or biometrics. If the credential or biometric is deemed valid, the access control circuitry then checks if the user is approved for access to the enclosure at the current time of day. Upon validation of access permission, the access control circuit will then energize the motorized latch, retracting the slam bolt into the latch housing, allowing the cabinet door to be opened.

When the locking bolt is drawn into the motorized latch housing, it is also drawn into the main lock assembly. The latching bolt may be spring loaded by a return spring, biasing the latching bolt out of the motorized latch housing. Such arrangement removes the blocking interaction between the latching bolt and the strike plate, allowing the user to open the enclosure.

The latching bolt remains drawn into the motorized latch housing for a programmable amount of time, allowing the user to open the cabinet door and gain access to the contents of the cabinet. In an exemplary embodiment, such programmable amount of time may correspond to five seconds, though the use of other times is encompassed by the present subject matter. Upon expiration of the open delay timer, the motorized latch releases the latching bolt. It then re-extends out of the latch housing and out of the main assembly housing. The latching bolt is then in position to re-lock the cabinet door upon its closing.

When the user has completed accessing the cabinet, the nurse or other user will slam the cabinet door. Such action will cause the latching bolt to hit the strike plate. The end of the latching bolt and the end of the strike plate are each provided with cam surfaces which cause the latching bolt to push into the motorized latch housing when the cabinet door is closed. When the latching bolt pushes into the motorized housing, the return spring is again charged. The strike plate is provided with a rectangular cutout section, located just past the cam surface, which is designed such that the latching bolt will enter it as the cabinet door closes.

After the latching bolt is pushed into the motorized latch housing and the door continues to close, the tip of the latching bolt travels on the bottom of the strike plate for some distance. Eventually, the tip encounters the rectangular cutout on the strike plate and the charged spring on the latching bolt causes it to re-extend from the motorized latch housing, entering the rectangular cutout section of the strike, locking the cabinet. The microprocessor then records the event, recording the card/pin number that accessed the cabinet as well as the date and time.

As described above, there are numerous variable settings for the access control system, for example, such as which users can access which locks. Other settings include (but are not limited to) temperature limit settings, alarm status, and supervisor status required after alarm settings. In accordance with the present subject matter, such settings can be made through a control panel on the front of the system, such as through a PC based access control system that is either directly connected to the lock or remotely connected to the lock over a network.

Reference will be made in detail to the various exemplary embodiments of an electronic lock in accordance with the present subject matter. Referring to the drawings, FIG. 1 illustrates an upper right perspective view of a cabinet 2 with the door in the closed and locked position with a lock 1 in accordance with the present technology installed thereon. Lock 1 includes a main housing 3, electronic assembly 4, battery pack 5, communications port 6, and programming keypad and display 7. Lock 1 is attached to cabinet 2 with a plurality of screws collectively noted as screw 10. Lock 1 is configured to engage a strike assembly 11 that, when properly positioned, keeps the cabinet locked. Strike assembly 11 may be attached to the cabinet 2 by screws or by other appropriate means including, but not limited to, pop-rivets, double sided tape, adhesives, and welding. Electronic assembly 4 is optionally electrically connected to thermistor assembly 8 by way of cable 9 (where temperature feedback is employed).

Figure 2:
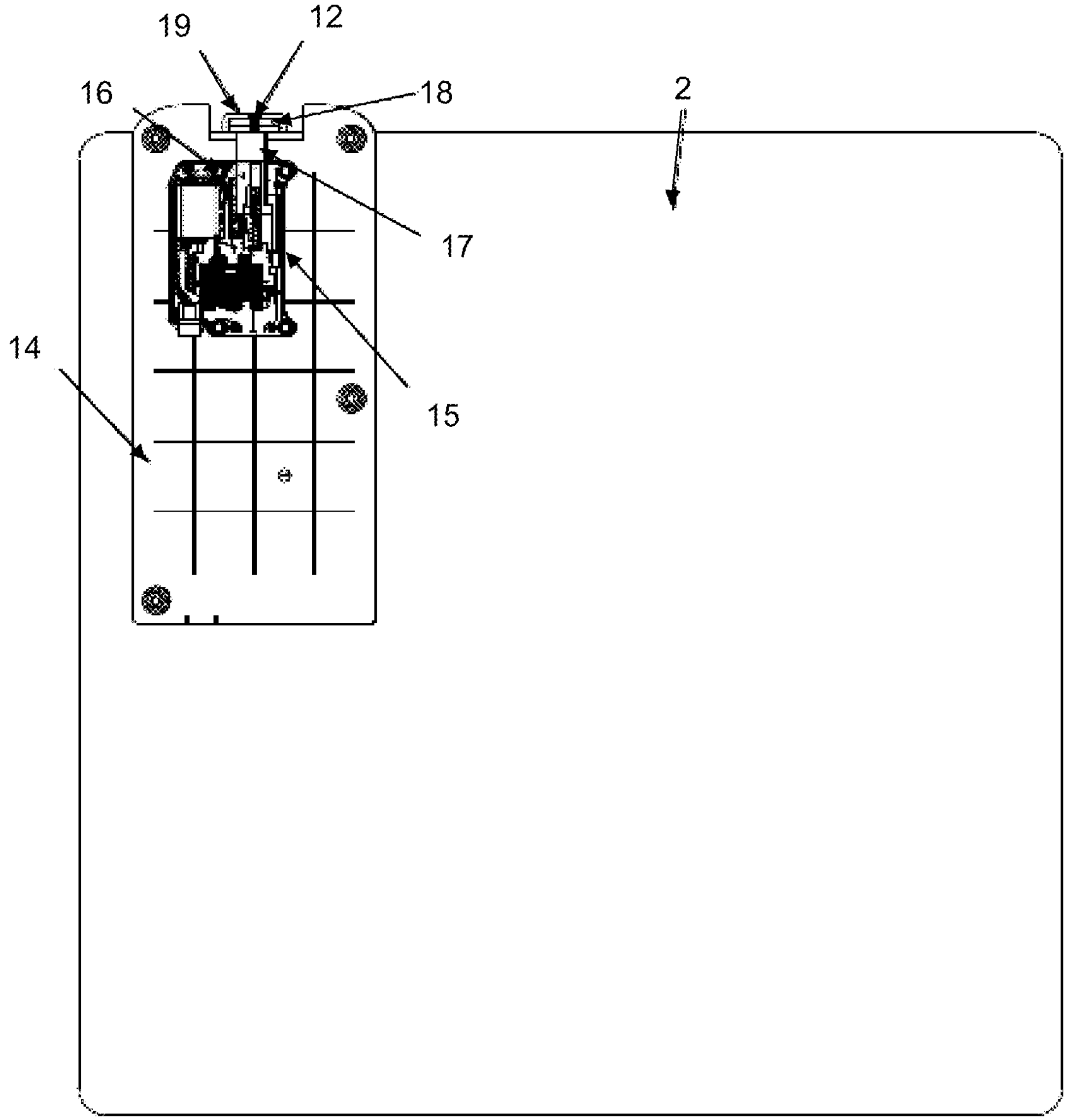
FIG. 2 depicts a front elevation view of an enclosure in accordance with one embodiment of the present technology and illustrating an exemplary present lock with cover portions thereof removed and with a latch bolt thereof engaging a present exemplary strike plate.

With reference to FIG. 2, there is illustrated a front view of a cabinet 2 in accordance with the present technology and illustrating a lock 1 with cover portions removed and exemplary latch bolt 17 thereof engaging a strike plate 18. A back cover 14, shown for reference purposes, may be attached to main housing 3 with screws (not illustrated) or by other appropriate means, as well understood by those of ordinary skill in the art without requiring additional detailed disclosure. Motorized latch assembly 15 is attached to main housing 3 with a plurality of screws 16 exemplarily noted by screw 16. Latch assembly 15 is provided with latch bolt 17 which engages an opening in strike plate 18 in the locked position to keep cabinet 2 locked. Strike plate 18 is attached to the top of the cabinet with mounting screws (not illustrated) and may be provided with a cover 19 which may be attached to strike plate 18 with a plurality of screws 12 or by other appropriate means.

Figure 3A:
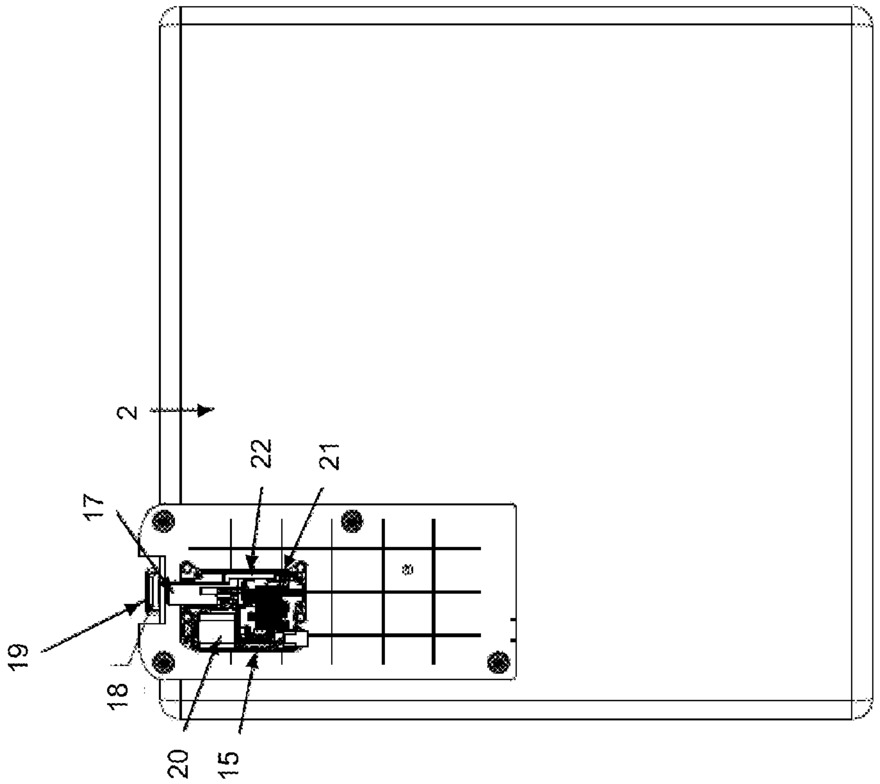
FIG. 3A depicts a front elevation view of an enclosure similar to that of FIG. 2 but partially illustrating internal components of an exemplary present latch thereof with the latch bolt retracted.
Figure 3B:
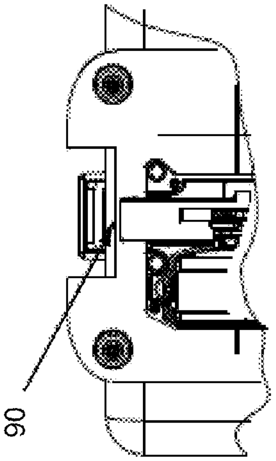
FIG. 3B depicts an isolated, relatively enlarged view of a portion of exemplary present lock illustrated in FIG. 3A, and illustrating in greater detail the retracted latch bolt thereof.

With reference to FIGS. 3A and 3B, there are illustrated, respectively, a front view of a cabinet 2 illustrating internal components of exemplary present motorized latch 15 with latch bolt 17 retracted, and an enlarged view of a portion of the lock illustrating retracted latch bolt 17. Those of ordinary skill in the art will appreciate that various mechanisms can be used to accomplish the same end result, that is, the retraction of bolt 17 into the motorized latch 15, and that the illustrated mechanism corresponds to exemplary such method and apparatus.

The prime mover in motorized latch 15 is motor 20. In an exemplary embodiment a permanent magnet DC motor may be used, however various types of motors can be employed. Motor 20 may be provided with gear train 21 that moves mechanism 22 which in turn retracts latch bolt 17 into latch 15. When latch bolt 17 is retracted, the blocking interaction of latch bolt 17 with strike plate 18 is removed, as shown more clearly by reference numeral 90 in FIG. 3B.

Figure 4A:
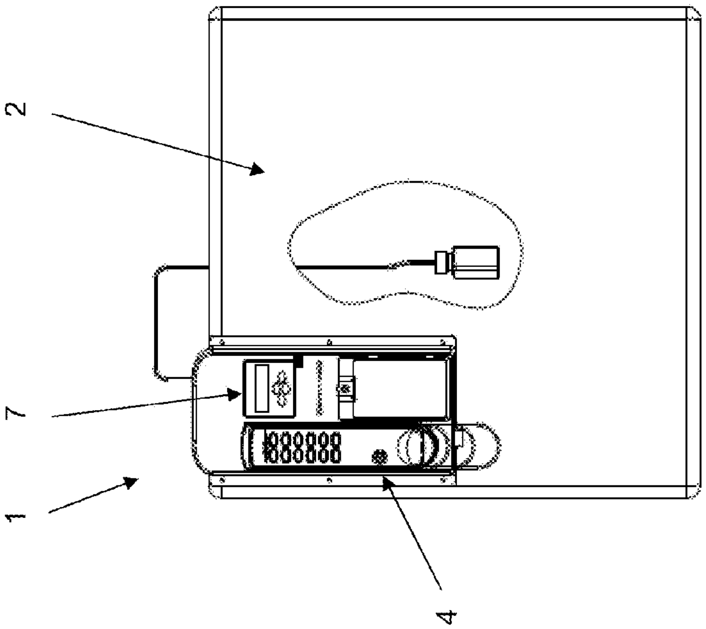
FIG. 4A depicts a front elevation view of an enclosure having an exemplary present lock installed thereon and illustrating a control panel including navigation keys for programming certain operational characteristics of the lock in accordance with one embodiment of the present technology, and illustrating the door thereof in partial cutaway for illustration of various present features internal to such enclosure.
Figure 4B:
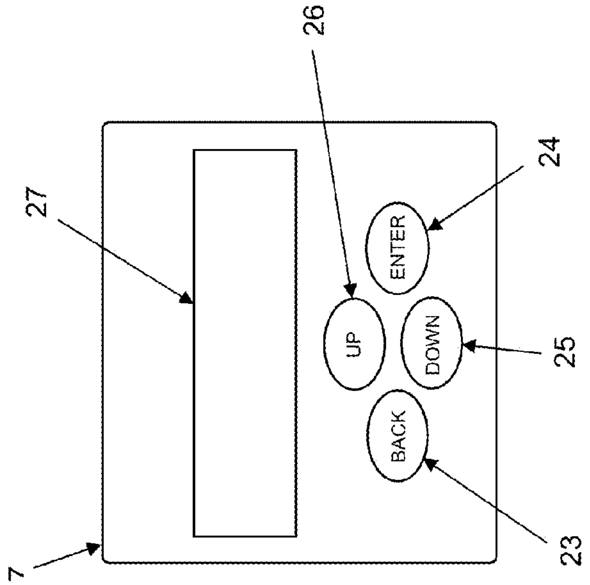
FIG. 4B depicts an enlarged portion of the representative control panel of present FIG. 4A, particularly illustrating exemplary navigation key features thereof.

With reference to FIGS. 4A and 4B, there are illustrated a front view of a cabinet 2 having a lock 1 installed thereon and illustrating an electronics assembly 4 including a control panel 7 and navigation keys 23, 24, 25, 26 for programming certain operational characteristics of the lock in accordance with the present technology. FIG. 4B illustrates an enlarged portion of control panel 7 particularly illustrating the navigation keys 23, 24, 25, 26 and display 27 thereof.

Motor 20 (FIG. 3B), and thereby latch bolt 17, are operated under the control of a microprocessor based circuit located within electronics assembly 4. In accordance with the illustrated exemplary embodiment of the present technology, electronics assembly 4 receives input from a user attempting to gain access to the cabinet via the exemplary ten oval keys shown on the face of electronics assembly 4 (see FIGS. 1 and 4A). It should be appreciated by those of ordinary skill in the art that a variety of different types of access control credentials may be used instead of or in addition to such ten oval keys. Such credentials may include, but are not limited to, proximity cards, magnetic stripe cards, smart cards, RF fobs, IR fobs, and Dallas Semiconductor i-Buttons, as well as a plethora of biometric type access control technologies available to industry.

When electronics assembly 4 receives data, in an exemplary case a personal identification number (PIN) from a user, electronics assembly 4 processes the PIN and determines the validity of the code. Typically, electronics assemblies of such type will have a number of available valid codes. In accordance with an exemplary embodiment, anywhere from 250 to 5000 valid codes may be provided. It should be appreciated, however, that such number is a design limitation determined primarily by specific needs associated with a particular installation of lock model and the amount of memory installed in the device, and not a particular limitation of broader aspects of the present subject matter.

Electronics assembly 4 is configured to compare an entered PIN to its list of pre-programmed valid codes. If the code is determined to be valid, access is granted and the electronics assembly 4 turns on motor 20. The lock can be programmed manually or through a personal computer (PC) based program.

With further reference to FIG. 4A, it will be seen that the front of the lock assembly 1 includes a keypad 7. Keypad 7, more specifically illustrated in FIG. 4B, is provided with representative buttons, including a back button 23, an enter button 24, a down button 25, an up button 26, and a display 27. In an exemplary embodiment, display 27 may correspond to an LCD display; however, other types of displays may also be employed. Such buttons and the display are used to navigate a menu based programming scheme. The programming scheme is used to select or unselect various programming options within a lock constructed in accordance with the present technology.

Figure 5:
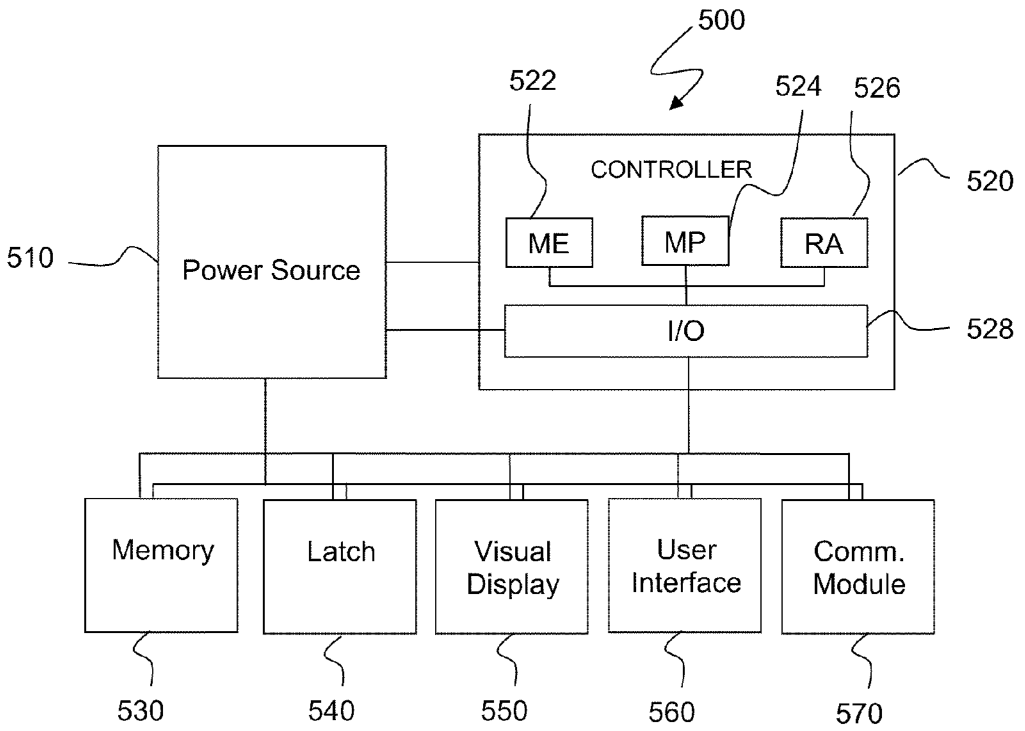
FIG. 5 depicts a block diagram of an exemplary electronic lock according to one exemplary embodiment of the present technology.

Referring to FIG. 5, a block diagram of an exemplary electronic lock 500 is shown in accordance with one embodiment of the present technology. As illustrated, electronic lock 500 may include a power source 510, a controller 520, memory 530, latch 540, visual display 550, user interface 560, and communications device or module 570. Power source 510 may be any power device for supplying power to the electronic lock 500. For instance, power source 510 may be a battery pack or other power pack that provides electrical power to electronic lock 500.

Power source 510 is operatively connected to both the controller 520 and to the various other components of the electronic lock. The controller 520 may have the capability to direct the power supply 510 to selectively provide power to the various components of the electronic lock 500 or to remove power from the various components of the electronic lock 500. For instance, the controller 520 may be configured to control when the communications device or module 570 receives power from the power supply 510 so that the controller 520 may selectively power on or power off the communications module 570 in accordance with certain aspects of the present technology, as will be discussed in detail below with reference to FIG. 7.

Controller 520 is the main processing unit of electronic lock 500. Controller 520 may include a memory 522, microprocessor 524, random access memory 526, and input/output device 528, as shown in FIG. 5. Those of ordinary skill in the art, using the teachings provided herein, should appreciate that the present subject matter is not limited to any particular controller 520, but may include any device configured to control the various components of the electronic lock 500.

Controller 520 may be programmed with various instructions to perform various functions in accordance with aspects of the present technology. For instance, controller 520 may include one or more computing devices that are adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including, but not limited to, application-specific circuits. Of course, combinations of computer-executed software and hard-wired logic or other circuitry may be suitable, as well. In a typical implementation, the controller could use a microcontroller chip attached to a memory device as well as other hardware to assist with various functions. The microcontroller could execute a special-purpose program produced using any programming language or combination of languages as may be suitable for the purpose, and as may exist or be later developed. While present technology lends itself to the use of separate chips for the CPU, memory, and other interface logic, the design would be just as applicable if some or all of those functions were combined into one or more larger chips.

Electronic lock 500 may include a memory 530 connected to the controller 520. Memory 530 may be used to store various types of data associated with electronic lock 500 and/or an electronic access control system. For instance, memory 520 may be used to store user data, such as, user name, credential type and ID, supervisor level, and valid access times; lock data, such as lock name, access hardware (e.g. keypad or hardware), and open time; relational data detailing which users can access or open which electronic locks; and audit trail data and/or inventory data.

Electronic lock 500 may include a latch mechanism 540 that is operatively connected to controller 520. Latch mechanism 540 may be similar to the electronic latch assembly discussed above or may be any other latch mechanism configured to secure a cabinet or enclosure. In a preferred exemplary embodiment, whenever latch mechanism 540 receives a command from controller 520, the latch assembly unlocks the cabinet or enclosure for which the electronic latch 500 is used to provide secure storage.

The subject embodiment of a present electronic lock may further include a visual display 550 and user interface 560. Such visual display 550 and user interface 560 allow for a user to input and/or manipulate data or other information into the lock and to visually inspect certain settings, features, and/or data or other information associated with the lock. The visual display 550 and user interface 560 may be similar to the user interface and visual display depicted in FIG. 4B, or may have any other configuration that allows for the display and manipulation of data or other information at the electronic lock.

Still referring to FIG. 5, controller 520 may be operatively connected to communications module 570 which is used to interface electronic lock 500 to a network, to a computing device, or to other electronic locks. Communications module 570 may be any device for enabling communication with other electrical devices. For example, the communications module may be a modem, a Bluetooth communications module, an RF communications module, or any other device that enables communications with a network or remote device. In a particular embodiment, communications module 570 may be a modem adapted to enable communications over an 802.11 WiFi wireless network.

Figure 6:
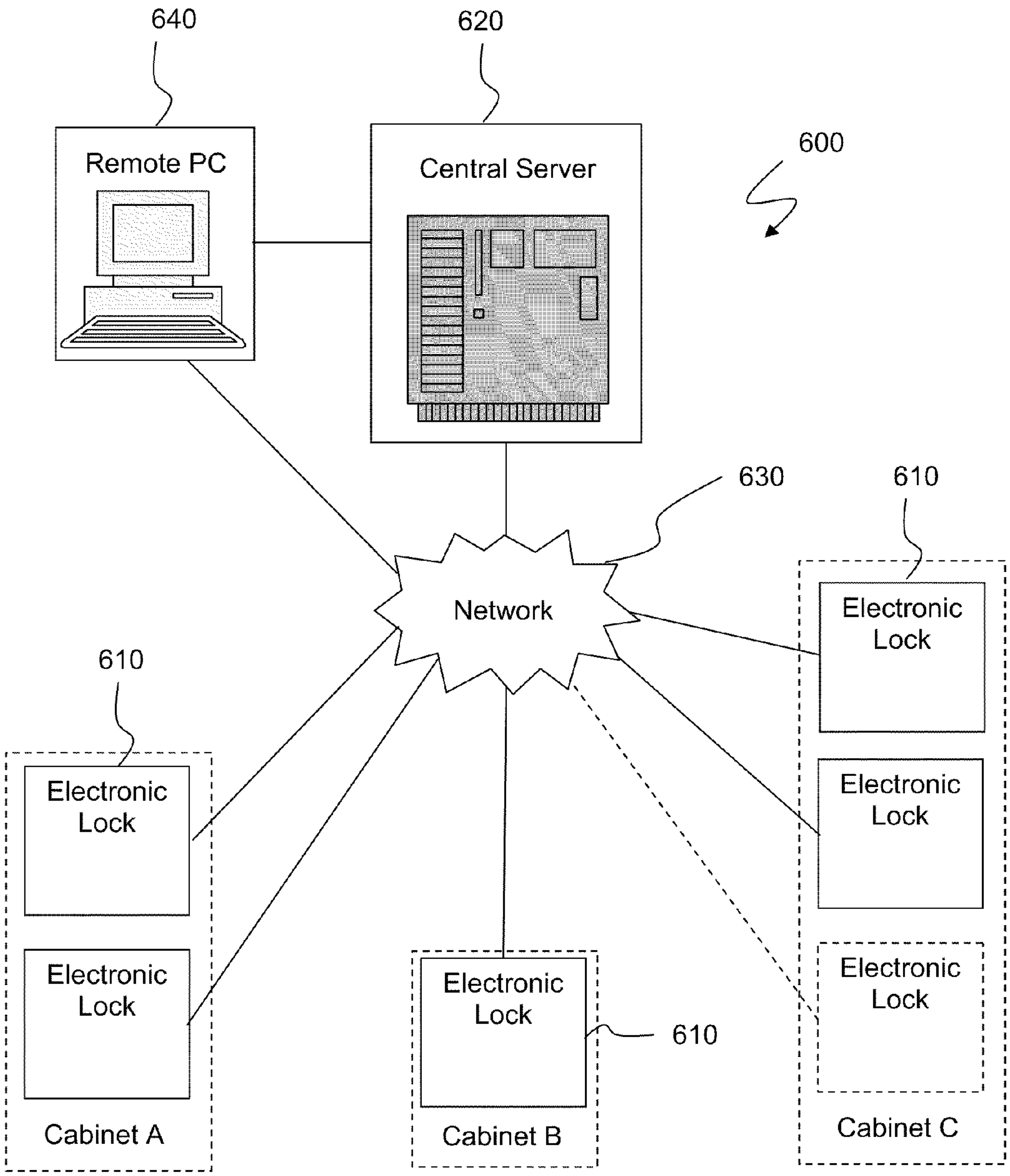
FIG. 6 depicts an exemplary present electronic access control system including a plurality of electronic locks used to secure a plurality of drawers on a variety of different enclosures or cabinets according to one exemplary embodiment of the present technology.

With reference to FIG. 6, a block diagram of an exemplary electronic access control system 600 used to secure a plurality of cabinets or enclosures is illustrated. Electronic access control system 600 includes a plurality of electronic locks 610 operatively connected to central server 620 over network 630. Based on the disclosure provided herein, one of ordinary skill in the art will recognize that the inherent flexibility of computer-based systems allows for a great variety of possible configurations, combinations, and/or divisions of tasks and functionality between and among components of the electronic access system 600. For instance, server processes discussed herein may be implemented using a single server or multiple servers working in combination. Those of ordinary skill in the art will appreciate that the various server representations in the drawings herewith are intended to represent both such single or multiple server implementations. Databases and applications may be implemented on a single system or distributed across multiple systems. Distributed components may operate sequentially or in parallel.

In electronic access control system 600, a plurality of electronic locks 610 are used to secure multiple cabinets, including Cabinet A, Cabinet B, and Cabinet C. Each of the cabinets may have one or more drawers or other secure locations for which an individual electronic lock 610 is required or desired. It is to be understood from the disclosure herewith that the terminology a plurality of securable enclosures may mean a group comprising respective cabinets (or other forms of enclosures), respective drawers, doors, or similar in one or more cabinets, or respective parts or subcomponents of various mixtures of the foregoing. For instance, Cabinet A is illustrated as having two electronic locks 610. Such two electronic locks 610 may be for separate drawers or other enclosures in Cabinet A. Similarly, Cabinet C is illustrated as having three electronic locks 610. Such three electronic locks 610 may be for separate drawers or other enclosures within Cabinet C. The third electronic lock 610 of Cabinet C is illustrated in dashed line to signify that any number of electronic locks 610 may be associated with a single cabinet or enclosure.

As discussed above, each of the electronic locks 610 of the electronic access control system 600 uses and creates data that must be managed by the access control system. For example, updates may need to be made as to which users can access which cabinets or enclosures. In the storage of medical products, updates may be desired which may include: settings of respective high and low temperature limits for the storage of the medical products, settings of the permitted time period outside such desired limits, settings of various alarms, and the setting of restricted access if certain limits are reached.

Access control systems may allow manipulation and control of the access control data at the actual electronic lock 610 itself through, for instance, user interface 560 shown in FIG. 5. In such circumstances, the updating and modification of access control data for each of the individual electronic locks 610 may require a supervisor, service person, or someone of higher position than a "normal" user to go to the lock 610 with a computer such as a laptop computer to perform the data updating and manipulation. Such method requires someone to visit each electronic lock 610 that needs to be updated. If there are hundreds of locks that need to be maintained, such process can be quite time consuming and expensive.

As shown in FIG. 6, the plurality of electronic locks 610 may be connected to a central server 620 over a network 630, per the present subject matter. In this manner, updates and other data manipulation and control can occur at the central server 620 and be communicated to each of the plurality of electronic locks 610 over network 630. Data can be managed at the central server 620 or via a remote computing device 640 operatively connected to central server 620.

Network 630 may be any hardwired or wireless network or combinations thereof for connecting the plurality of electronic locks 610 to central server 620. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links.

In one embodiment, the plurality of electronic locks 610 are connected to central server 620 through a 802.11 WiFi network interface. Enabling wireless communication over an 802.11 WiFi network has many advantages, including, for example, facilitating the exchange of data between a central server and an electronic lock that is used to secure a mobile cabinet or enclosure that would be difficult to connect to a hard wired network.

Electronic locks 610 may interface with network 630, for example, through communications module 570 shown in FIG. 5. Unfortunately, current WiFi wireless network technology does not lend itself to long term battery operation (such as multiple months, or a year, or more). Communications modules adapted to communicate with 802.11 WiFi wireless networks have significant power requirements. Battery packs or other power source modules powering such communication modules often need to be recharged frequently, sometimes daily, to provide continuous power to the communication modules. Charging of battery packs or other power modules on electronic locks, however, is a commercially unfeasible option.

Existing communication modules for communication over 802.11 WiFi networks include a "sleep mode" during which the communication module draws less power from the power source to preserve power supply resources. The communication module, while in "sleep mode" listens for a wake up signal communicated over the WiFi network. The communications module wakes up and returns to full power upon hearing of the wake up signal. After data has been communicated over the network, the communication module may return to a "sleep mode" to preserve power supply resources.

Such "sleep mode" feature as currently available is still generally commercially undesirable for electronic lock systems because the communications module, while in "sleep mode," still draws significant power from the power supply source. Therefore, while sleep modes may be helpful under some present or future circumstances, a design which does not require them essentially has more present versatility.

One aspect of the present technology preserves power supply resources while enabling communication over an 802.11 WiFi network. According to such aspect of the present technology, an electronic lock includes a controller that is capable of completely powering off a communication module for enabling communications over an 802.11 WiFi network. For instance, as shown in FIG. 5, controller 520 may be adapted to completely power off the communications module 570. By completely powering off the 802.11 WiFi communications module, significant power supply resources can be preserved or conserved.

Once the 802.11 WiFi communications module has been powered off, it can no longer listen for a wake-up signal which triggers the communications module to power back on and to receive and transmit data over the network. To address such issue, one aspect of the present technology for particular embodiments includes programming the electronic lock to periodically power on the 802.11 WiFi communications module at predetermined time intervals to enable communication over the network. For instance, the electronic lock may be programmed to power on the communications module once a day, once a week, once a month, or after any other time interval. In addition, the electronic lock may include a manual button or other interface that enables a user to manually power on the communications module. After the communications module has been powered on, the electronic lock can receive and transmit data over the network until the communications module powers back down.

Figure 7:
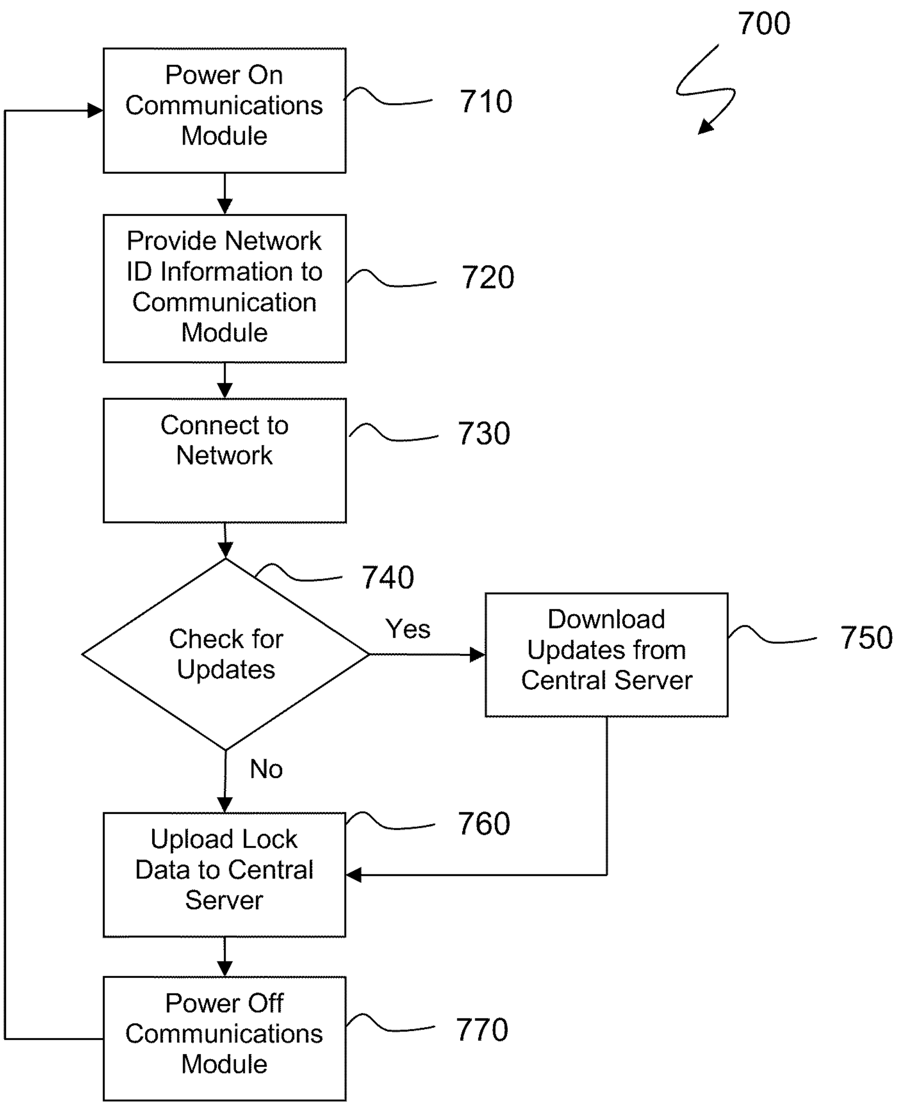
FIG. 7 depicts exemplary steps associated with a method according to one exemplary embodiment of the present technology.

With reference to FIG. 7, an exemplary method for enabling network communication over an 802.11 WiFi wireless network will be discussed in detail. At step 710, a communications module of an electronic lock is powered on. The communications module may be powered on pursuant to programmed instructions from the electronic lock or pursuant to the manual pressing of a button on the electronic lock or other triggering event that directs the communications module of the electronic lock to power on.

At step 720, network identification information is provided to the communications module. Such network identification information must be provided to the communications module to allow the communications module to connect to and communicate over the network. Such information may include, for example, the SSID of the 802.11 WiFi network, the appropriate encryption pass keys to enable access to the WiFi network, and/or the IP address of the central server. Once the network identification information has been provided to the communications module, the communications module can connect the electronic lock to the network, as shown at step 730. The electronic lock can then communicate with a central server or other remote device over the network and can receive and transmit data over the network.

At step 740, the electronic lock checks for updates from the central server. If updates are available, then the electronic lock downloads such updates and stores them in memory as shown at step 750. For instance, the electronic lock may download new relational data which identifies which users can access the cabinet or enclosure secured by the electronic lock. At step 760, the electronic lock uploads data, such as audit trail data or inventory information to the central server. In such manner, audit trail data, inventory data, and other data stored at the individual locks may be updated to a central location periodically over the network without a supervisor having to visit each individual lock.

At step 770, the communications module of the electronic lock is powered off to conserve power supply resources. The electronic lock may be programmed to power off the communications module after a predetermined time interval after the communications module has been powered on. In addition, the electronic lock may be programmed to power off the communications module once all updates have been downloaded from the central server and once all lock data, such as audit trail data and inventory data, have been uploaded to the central server.

The present technology allows for the interfacing of many electronic locks to a central server over an 802.11 WiFi wireless network while preserving limited power supply resources available with electronic locks. As many businesses and medical facilities already have existing 802.11 WiFi wireless networks, the present technology facilitates the implementation of an electronic access control systems using existing infrastructure. The networked connection of electronic locks to a central server allows for the updating of many electronic locks simultaneously and facilitates the tracking of lock data such as audit trail data and inventory data from a central location, providing significant advantages.

By connecting a plurality of electronic locks over a network, a supervisor or other user can then update electronic access control data used by the locks in one of two ways. The supervisor or other user can provide updates to the electronic lock at the individual lock, or the supervisor or other user can provide the updates into a central server, which then communicates each of those updates to the individual electronic locks.

An access control system capable of updating multiple electronic locks simultaneously, such as over a WiFi network or other network, may generate database control problems. Low end database control systems utilizing, for example, Microsoft Access, lose significant reliability if multiple database manipulations occur simultaneously. In order to accomplish multiple reliable database manipulations simultaneously, a more sophisticated database management system may be required. However, using such a sophisticated database management system creates difficulties in implementation, as microprocessors in electronic locks that can communicate with these databases are expensive. Moreover, such microprocessors do not lend themselves to low energy consumption.

Figure 8:
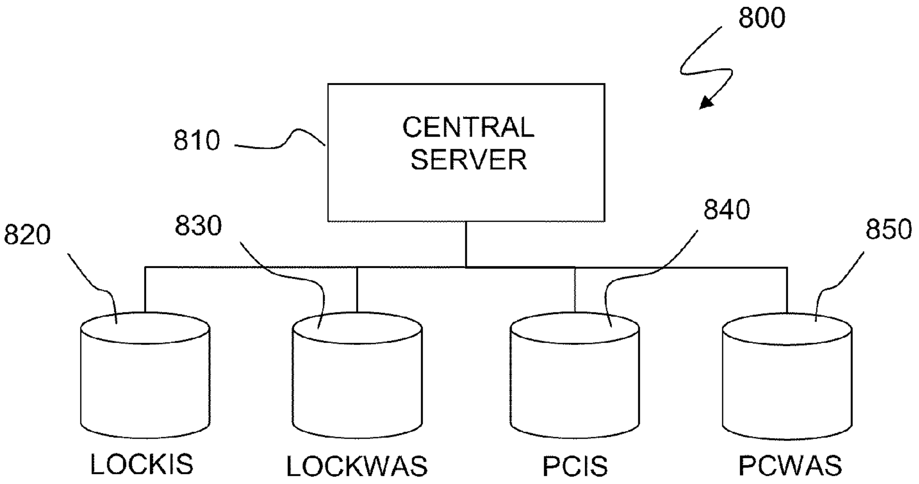
FIG. 8 depicts a database system according to one exemplary embodiment of the present technology.
Figure 9:
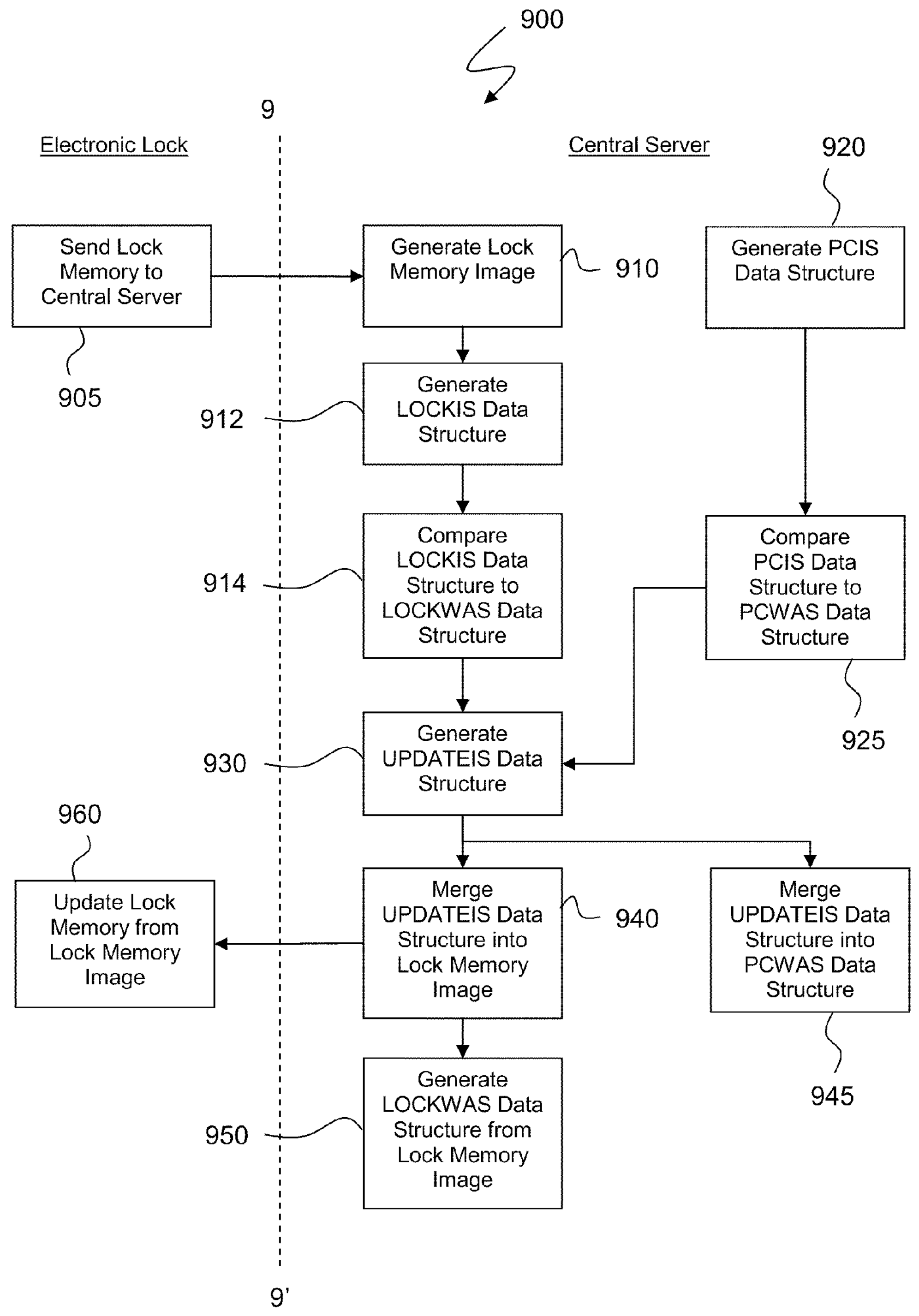
FIG. 9 depicts exemplary steps associated with a method according to another exemplary embodiment of the present technology.

Another aspect of the present technology provides for efficient data exchange between the plurality of electronic locks and the central server without having to integrate expensive processing capability into the individual electronic locks. The methodology and apparatus according to such exemplary aspect of certain embodiments of the present subject matter shifts the computing horsepower from the small processors and controllers available on an electronic lock to the more significant computing resources available at a central server. With reference to FIGS. 8 and 9, present exemplary methodology and apparatus are discussed in detail.

FIG. 8 depicts an exemplary database structure 800 that may be used in accordance with one exemplary embodiment of the present subject matter. The database structure 800 uses four databases that are operably connected to central server 810. Such databases include LOCKIS 820; LOCKWAS 830; PCIS 840 and PCWAS 840. The LOCKIS database 820 includes data and/or information about the current state of data stored in the memory of the electronic lock. The LOCK- WAS database 830 includes data and/or information about the state of data stored in the memory of the electronic lock the last time the electronic lock was connected to the central server 810. The PCIS database 840 contains data and/or information about the current state of data stored at the central server. The PCWAS database 850 contains data and/or information about the state of data stored at the central server the last time the electronic lock was connected to the central server. The electronic access control system uses such exemplary four databases to reconcile the information and/or data stored or provided at the central server with the plurality of electronic locks.

FIG. 9 depicts the exemplary steps associated with one exemplary present method 900 of updating a plurality of electronic locks connected to a central server. At step 905, an electronic lock sends information stored in lock memory to the central server. Central server generates a lock memory image from this information as illustrated at step 910 and generates data structure LOCKIS from such lock memory image as illustrated at step 912. Such LOCKIS data structure includes data and/or information about the current state of data stored in the memory of the electronic lock.

At step 914, exemplary present method 900 compares the LOCKIS data structure to the LOCKWAS data structure already stored at the central server. The LOCKWAS data structure includes data and/or information about the state of data stored in the memory of the electronic lock the last time the electronic lock was connected to the central server 810. The purpose of such comparison is to see if a supervisor or other user has input updates at the electronic lock since the last update from the central server that are not yet reflected in the central server memory. Present exemplary method 900 compares the LOCKIS data structure to the LOCKWAS data structure to determine any differences. The differences between the LOCKIS data structure and the LOCKWAS data structure are used to generate temporary data structure UPDATEIS as shown at step 930.

At step 920, the central server generates the PCIS data structure. The PCIS data structure contains data and/or information about the current state of data stored at the central server. For example, the PCIS data structure includes update information input into the central server by a supervisor or user. At step 925, the method 900 compares the PCIS data structure to the PCWAS data structure. The PCWAS data structure includes data and/or information about the state of data stored in the memory of the central server the last time the electronic lock was connected to the central server 810. The purpose of such comparison is to see if a supervisor or other user has input updates at the central server since the last update from the central server that are not yet reflected in the electronic lock memory. Present exemplary method 900 compares the PCIS data structure to the PCWAS data structure to determine any differences. The differences between the PCIS data structure and the PCWAS data structure are used to generate temporary data structure UPDATEIS as shown at step 930.

UPDATEIS data structure is a temporary data structure created by the central server that includes differences between the PCIS and PCWAS data structures and the LOCKIS and LOCKWAS data structures. At step 940, the central server merges such temporary UPDATEIS data structure into the lock memory image that reflects updates input by a user or supervisor at the central server. At step 945, the central server uses such UPDATEIS data structure to generate a new PCWAS data structure that reflects updates input by a user or supervisor at the electronic lock. Those of ordinary skill in the art will appreciate from the flowcharts herewith that additional features and functionality exist, even though not described herein in detail. For example, in some instances the comparison of differences between the PCIS and PCWAS data structures and the LOCKIS and LOCKWAS data structures will yield different changes (for example, 60 seconds in the former instance, and 30 seconds in the latter instance). In such events, typically there will be an inherently dominate feature which will prevail (such as the PC in the example above).

At step 950, the central server generates a new LOCKWAS data structure. The central server then updates the lock memory from the lock memory image as shown at step 960. As illustrated in FIG. 9, the majority of steps associated with method 900 occur at the central server. The dashed line 9-9' indicates the exemplary present separation of steps that can occur at the central server and the steps that can occur at the electronic lock. As can be seen, the electronic lock is only required to transmit its lock memory to the central server as shown at step 905 and to receive updates to the lock memory as illustrated at step 960. All of the other processing steps associated with method 900 per present subject matter may occur at the central server. In such manner, such aspect of certain embodiments of the present technology shifts computing resources from the electronic lock to the central server. Such allows smaller, less expensive processors and controllers to be used in the electronic locks and preserves power supply resources at the electronic lock. While present embodiments may favor a particular division of labor between the lock's controller and the server, future embodiments may favor a different balance.

While the present subject matter has been described in detail with respect to specific exemplary embodiments and methods thereof, it will be appreciated that those skilled in the art, upon attaining an understanding of the foregoing, may readily produce alterations to, variations of and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. An electronic network system for electronically controlled locks, comprising:
- a communications network configured to communicate with 802.11 WiFi wireless communications modules;
- a plurality of electronic locks, respectively associated with a plurality of securable enclosures, each of said electronic locks having;
  - respective 802.11 WiFi wireless communications modules for respectively connecting said each electronic lock with said communications network,
  - a battery,
  - a microprocessor-based controller for selectively powering on and off said 802.11 WiFi wireless communications module with said battery,
  - a main housing associated with an enclosure,
  - data memory to record associated electronic lock activities and data,
  - an electronic latch,
  - a visual display, and
  - a user interface; and
- a central server, connected with said plurality of electronic locks over said network, and selectively providing data updates and data management for each of said electronic locks;

wherein each of said electronic locks is operative to provide access to an associated enclosure through actuation of an associated electronic latch upon presentation of a valid access credential to said user interface thereof;

said central server and each of said plurality of electronic locks each include a database structure with multiple databases;

said system further includes a PC in communication with one of said central server and said network, and operable with said database structure, for data exchange with said plurality of electronic locks, to facilitate data exchange between said central server and said plurality of electronic locks by allowing multiple simultaneous database manipulations via said communications network;

each of said controllers for said plurality of electronic locks is further operative for selectively powering on and off an associated 802.11 WiFi communications module;

each of said controllers for said plurality of electronic locks is further operative for powering on an associated 802.11 WiFi communications module with said battery at predetermined time intervals to enable communication over said network, and for powering off said associated module at one of either of a predetermined time interval after said associated communications module has been powered on, or once updates have been downloaded from said central server and once all data from said data memory have been uploaded to said central server;

each of said controllers further include a control panel for programming directly at each said electronic lock selected operational characteristics of an associated electronic lock; and said multiple databases of said databases structures of said central server and each of said plurality of electronic locks each includes databases LOCKIS, LOCKWAS, PCIS, and PCWAS, each for holding data corresponding with its respective database name; and said system further including reconciling means for temporarily storing differences between selected of said LOCKIS, LOCKWAS, PCIS, and PCWAS databases in a temporary database UPDATEIS respectively in each of said database structures, and reconciling said databases relative to differences between data in said data memories of said electronic locks and data at said central server.

2. An electronic network system as in claim 1, wherein each of said data memories includes recorded therein for an associated electronic lock at least one of user name, credential type and ID, supervisor level, valid access times, lock name, access hardware type, open time, authorized user lists, inventory data, audit trail data, and environmental tracking data.

3. An electronic network system as in claim 1, wherein:

at least one of said securable enclosures comprises a temperature controlled cabinet with an associated temperature transducer therein for providing environmental tracking data; and selected of said electronic locks include adjustable settings, including at least one of alarm settings and temperature limit settings, and records data for alarm status and events, and supervisor status required after alarm events.

4. An electronic network system as in claim 1, wherein said PC in communication with one of said central server and said network is configured to allow a supervisor level user to selectively update said plurality of electronic locks and to selectively track lock data from said plurality of electronic locks.

5. An electronic network system as in claim 1, wherein:

selected of said plurality of electronic locks each respectively have associated housings for retrofit to said plurality of securable enclosures;

selected of said enclosures include a plurality of separate compartments; and selected of said plurality of electronic locks are respectively associated with respective separate compartments of a given enclosure.

6. Methodology for extending battery life for electronically controlled locks operative in an electronic network system, comprising the steps of:

providing a communications network configured to provide wireless communications;

providing a plurality of electronic locks, respectively associated with a plurality of securable enclosures, each of said electronic locks having respective wireless communications modules, a battery, and data memory to record associated electronic lock activities and data;

providing a central server, connected with said plurality of electronic locks over said network;

selectively providing data updates and data management for each of said electronic locks;

selectively providing access to an associated enclosure through actuation of an associated electronic lock upon presentation of a valid access credential to said electronic lock;

providing respective controllers for each of said plurality of electronic locks, operative for powering on an associated communications module with said battery at predetermined time intervals to enable communication over said network, and for powering off said associated module at one of either of a predetermined time interval after said associated communications module has been powered on, or once updates have been downloaded from said central server and once all data from said data memory have been uploaded to said central server, in order to maximize life of said battery;

providing said central server and each of said plurality of electronic locks each with a database structure with multiple databases;

providing a PC in communication with one of said central server and said network, and operable with said database structure, for data exchange with said plurality of electronic locks, to facilitate data exchange between said central server and said plurality of electronic locks by allowing multiple simultaneous database manipulations via said communications network;

providing each of said controllers with a control panel to permit directly at each such lock programming of selected operational characteristics of an associated electronic lock;

providing said multiple databases of said database structures of said central server and each of said plurality of electronic locks each with databases LOCKIS, LOCKWAS, PCIS, and PCWAS, each for holding data corresponding with its respective database name; and temporarily storing differences between selected of said LOCKIS, LOCKWAS, PCIS, and PCWAS databases in a temporary database UPDATEIS respectively in each of said database structures, and reconciling said databases relative to differences between data in said data memories of said electronic locks and data at said central server.

7. Methodology as in claim 6, wherein:

said wireless communications modules comprise 802.11 WiFi wireless communications modules; and said communications network is configured to communicate with 802.11 WiFi wireless communications modules.

8. Methodology as in claim 6, further including:

providing each of said electronic locks with a main housing associated with an enclosure, an electronic latch, a visual display, and a user interface; and wherein each of said controllers comprises a microprocessor-based controller for selectively powering on and off said wireless communications module with said battery.

9. Methodology as in claim 6, further including recording in each of said data memories for an associated electronic lock at least one of user name, credential type and ID, supervisor level, valid access times, lock name, access hardware type, open time, authorized user lists, inventory data, audit trail data, and environmental tracking data.

10. Methodology as in claim 6, further including:

providing at least one of said securable enclosures as a temperature controlled cabinet with an associated temperature transducer therein for providing environmental tracking data; and providing selected of said electronic locks with adjustable settings, including at least one of alarm settings and temperature limit settings, and for such selected locks recording data for alarm status and events, and supervisor status required after alarm events.

11. Methodology as in claim 6, further comprising configuring said PC in communication with one of said central server and said network for allowing a supervisor level user to selectively update said plurality of electronic locks and to selectively track lock data from said plurality of electronic locks.

12. Methodology as in claim 6, further including:

providing selected of said plurality of electronic locks each respectively with associated housings which are retrofit to said plurality of securable enclosures;

providing selected of said enclosures with a plurality of separate compartments; and respectively associating selected of said plurality of electronic locks with respective separate compartments of a given enclosure.

* * * * *